(12) United States Patent
Vicari

(10) Patent No.: US 7,786,229 B2
(45) Date of Patent: *Aug. 31, 2010

(54) VINYL ALCOHOL COPOLYMERS FOR USE IN AQUEOUS DISPERSIONS AND MELT EXTRUDED ARTICLES

(75) Inventor: Richard Vicari, Pearland, TX (US)

(73) Assignee: Sekisui Specialty Chemicals America, LLC, Dallas, TX (US)

( * ) Notice: Subject to any disclaimer, the term of this patent is extended or adjusted under 35 U.S.C. 154(b) by 1 day.

This patent is subject to a terminal disclaimer.

(21) Appl. No.: 11/147,910

(22) Filed: Jun. 7, 2005

(65) Prior Publication Data

US 2005/0222355 A1      Oct. 6, 2005

Related U.S. Application Data

(63) Continuation-in-part of application No. 10/946,970, filed on Sep. 21, 2004, which is a continuation-in-part of application No. 10/618,248, filed on Jul. 11, 2003, now Pat. No. 6,818,709.

(51) Int. Cl.
*C08F 2/00* (2006.01)
*C08F 20/00* (2006.01)
*C08F 12/28* (2006.01)
*C08F 218/02* (2006.01)

(52) U.S. Cl. .................. 526/65; 526/67; 526/303.1; 526/310; 526/330

(58) Field of Classification Search .............. 526/65, 526/67, 303.1, 310, 330
See application file for complete search history.

(56) References Cited

FOREIGN PATENT DOCUMENTS

JP      621887-33241      *  6/1981

* cited by examiner

*Primary Examiner*—William K Cheung
(74) *Attorney, Agent, or Firm*—Michael W. Ferrell

(57) ABSTRACT

A product comprising a cold water soluble film wherein: a) the film comprises a copolymer of vinyl alcohol (VOH) with a minor amount of 2-acrylamido-2-methyl propane sulfonic acid in free acid form or as a salt of the free acid (AMPS); and b) the film has a harsh chemical dissolution time of less than about 80 seconds measured by the harsh chemical dissolution test method after 8 weeks.

25 Claims, No Drawings

VINYL ALCOHOL COPOLYMERS FOR USE IN AQUEOUS DISPERSIONS AND MELT EXTRUDED ARTICLES

CROSS-REFERENCE TO RELATED CASES

This application is a Continuation-in-part application of prior U.S. application Ser. No. 10/946,970, filed on Sep. 21, 2004, now pending, which is a Continuation-in-part application of prior U.S. application Ser. No. 10/618,248, filed Jul. 11, 2003, which issued as U.S. Pat. No. 6,818,709.

BACKGROUND OF THE INVENTION

Copolymers of vinyl alcohol (VOH) with a minor amount of 2-acrylamido-2-methyl propane sulfonic acid in free acid form or as a salt of the free acid (AMPS) are known in the art and are useful for various applications, e.g., the production of cold water soluble films which can be formed into containers for predetermined batches of soaps and detergents, temporary sizing for new garments prior to their first washing and oil drilling applications where these copolymers can serve for the temporary shoring up of concrete supports used to maintain the integrity of wells prior to the setting of the concrete.

A problem with the production of these copolymers by prior art methods is that it is difficult to produce the copolymer with a sufficiently high content of polymerized AMPS while maintaining satisfactory levels of productivity and avoiding compositional drift, i.e., unacceptable variations in the content of AMPS in the copolymer from one batch to the next. Thus, any process which is capable of producing VOH/AMPS copolymers with satisfactory loading of polymerized AMPS, combined with relatively high productivity and low compositional drift, is much to be desired.

BRIEF SUMMARY OF THE INVENTION

In accordance with this invention, a process is provided for the production of a copolymer of vinyl alcohol (VOH) and 2-acrylamido-2-methyl propane sulfonic acid or a salt of such acid (AMPS) by steps including continuously feeding with agitation, vinyl acetate (VAM) and AMPS as comonomers, a free radical yielding polymerization initiator, and a solvent for said comonomers, initiator, and copolymer resulting from the copolymerization of said comonomers, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a copolymer of VOH and AMPS.

DETAILED DESCRIPTION OF THE INVENTION

In carrying out the foregoing process the comonomer with VAM may be the free acid form of AMPS or the sodium, potassium, or ammonium salt of such free acid form.

The free radical yielding polymerization initiator utilized for the copolymerization of VAc and AMPS or salt of AMP may be, for example, 2-ethylhexyl peroxydicarbonate (Trigonox EHP), 2,2'-azobisisobutylronitrile (AIBN), t-butyl peroxyneodecanoate, bis(4-t-butylcyclohexyl) peroxydicarbonate, di-n-propyl peroxydicarbonate, di-n-butyl peroxydicarbonate, di-acetyl peroxydicarbonate, di-s-butyl peroxydicarbonate. Essentially any initiator able to generate free radicals can be used.

Optionally, acetaldehyde (AcH) as a chain transfer agent can be continuously fed to the first reaction zone with the other components. The amount of AcH may, for example, be up to about 0.2 wt. % based on the total of VAM and AcH being added.

A solvent for the comonomers VAM and AMPS, the polymerization initiator and the copolymer being formed in the two reaction zones is generally employed in the process. Suitable solvents are, for example, methanol, ethanol, and propanol. The preferred solvent is methanol.

The amount of AMPS continuously fed to both reaction zones is, for example, about 1 to about 20 wt. %, preferably about 4 to 15 wt. % based on the total of VAM and AMPS being fed. The "split" or ratio between the amounts of AMPS fed to the first and second reaction zones, respectively, may be, for example, from about 55:45 to about 80:20.

The amount of polymerization initiator fed to the first reaction zone may be, for example, about 0.0001 to about 1 wt. % based on the weight of VAM being fed.

The amount of solvent fed to the first reaction zone may be, for example, about 10 to about 40 wt. % based on the weight of VAM being fed. The polymerization initiator is preferably fed to the first reaction zone as a solution in the solvent at a concentration in the solvent of about 0.1 to about 10 wt. % based on the weight of the solution.

The average residence time in the first reaction zone of the components fed to the first reaction zone may be, for example, in the range of about 30 to about 120 minutes, preferably about 45 to about 70 minutes.

The reaction temperature in the first reaction zone is, for example, about 55° C. to about 85° C., preferably about 60° C. to about 80° C.

The average residence time in the second reaction zone of the components in the effluent from the first reaction one and the additional AMPS fed to the second reaction zone may be, for example, in the range of about 30 to about 120 minutes, preferably about 45 to about 70 minutes.

The reaction temperature in the second reaction zone may be, for example, about 55° C. to about 85° C., preferably about 60° C. to about 80° C.

The pressure in each reaction zone may be in the range, for example, of about 1 to about 30 psi, preferably about 3 to about 15 psi.

The residence times and temperatures in the first and second reaction zones are generally sufficient to result in the polymerization of substantially all of the AMPS fed to the system although a small percentage of VAM added to the system may remain unpolymerized.

The polymer solids content in the effluent from the second reaction zone may be, for example, in the range of about 40 to about 85%, preferably about 55 to about 75%, while the percent conversion calculated from actual polymer solids content and the theoretical polymer solids content equal to the amount of monomers added may be in the range of about 70 to about 99%, preferably about 80 to about 98%. The molecular weight of the copolymer from the second reaction zone indicated by the viscosity of a 15 wt. % solution in methanol is in the range, for example, of about 4 to about 200 cps preferably about 7 to about 30 cps.

In carrying out the saponification step resulting in VOH/AMPS copolymers, the effluent from the second reaction zone may, for example, be fed to a stripping column to remove the more volatile components such as unreacted VAM from the copolymer of VAM and AMPS. The resulting "paste" is then mixed with an aqueous solution of a strong base such as sodium hydroxide, e.g., containing about 10 to about 50 wt. % of sodium hydroxide to provide base at a caustic mole ratio (CMR, ratio of moles of base to moles of acetate in the copolymer) of about 0.01 to about 0.1. Optionally, an amount of a volatile alcohol, e.g., methanol, is also added to reduce the solids content in the paste to about 30 to about 65 wt. %. The resulting mass is then allowed to react at a temperature from about room temperature (RT, about 22 C.), to about 50 C. for a period, e.g., about 5 minutes to about 24 hours to obtain a percent hydrolysis of the acetate groups in the copolymer to hydroxyl groups, e.g., in the range of about 70 to about 99+%, preferably in the range of about 80 to about 95%.

The saponified copolymer of VOH and AMPS may have, for example, about 1 to about 8 mol % of polymerized AMPS (poly AMPS), about 1 to about 20 mol % of polymerized VAM (PVAc) and about 75 to about 98 mol % of polymerized vinyl alcohol (PVOH), preferably about 2 to about 4 mol % of poly AMPS, about 5 to about 10 mol % of PVAc, and about 85 to about 95 mol % of PVOH, a degree of hydrolysis of, for example, about 70 to about 99+%, preferably about 80 to about 95% indicated by $C^{13}$ NMR and a relative molecular weight indicated by the viscosity of a 4% aqueous-solution of the VOH copolymer of, for example, about 3 to about 30 cps, preferably about 7 to about 10 cps.

The following examples further illustrate the invention. Examples 1-11 describe the preparation of copolymers of VAM and the sodium salt of a copolymer of 2-acrylamido-2-methyl propane sulfonic propane sulfonic acid (SAMPS) by a continuous process under varying process conditions.

Polymerizations were performed using two jacketed 2-L glass reactors in series fitted with reflux condensers, mechanical stirrers and feed lines. Reactor 1 was fed continuously with vinyl acetate (VAM), which, in some examples, contained acetaldehyde (AcH), methanol containing di(ethylhexyl) peroxy dicarbonate (EHP) initiator, and SAMPS, each as a separate feed line using metering pumps. To ensure accurate feed rates, each feed was placed on a balance and the feed rates checked by measuring the weight difference with time. SAMPS was also fed continuously to the second reactor to minimize compositional drift (the split between Reactor 1 and Reactor 2 was 75:25). Table 1 lists the feed rates and initiator and aldehyde concentrations for the runs. Reactor 1 temperature was 60° C. and Reactor 2 temperature was 64° C. The residence time was 1 hour in each reactor. The polymer solution coming out of Reactor 2 was fed into an Oldershaw column to remove residual vinyl acetate using methanol vapors. Each run was 12 hours long to ensure the polymerization was lined-out

TABLE 1

Feedrates for the Continuous Polymerization Runs
Concentration (wt. %)
% EHP in % AcH in Feedrate, g/min

| Example | MeOH | VAM | VAM/AcH | SAMPS | MeOH/EHP |
|---|---|---|---|---|---|
| 1 | 4.11 | 0 | 15.69 | 1.08 | 5.73 |
| 2 | 6.98 | 0 | 16.63 | 2.29 | 3.58 |
| 3 | 1.41 | 0 | 15.07 | 2.08 | 5.35 |
| 4 | 4.11 | 0 | 14.97 | 2.06 | 5.46 |

TABLE 1-continued

Feedrates for the Continuous Polymerization Runs
Concentration (wt. %)
% EHP in % AcH in Feedrate, g/min

| Example | MeOH | VAM | VAM/AcH | SAMPS | MeOH/EHP |
|---|---|---|---|---|---|
| 5 | 4.11 | 1.96 | 15.07 | 2.04 | 5.39 |
| 6 | 2.44 | 0 | 17.66 | 1.22 | 3.62 |
| 7 | 2.44 | 1.96 | 16.84 | 2.28 | 3.38 |
| 8 | 1.41 | 1.96 | 15.89 | 1.07 | 5.53 |
| 9 | 6.98 | 1.96 | 17.6 | 1.19 | 3.71 |
| 10 | 3.51 | 0.99 | 16.25 | 1.66 | 3.71 |
| 11 | 3.51 | 0.99 | 16.25 | 1.66 | 3.71 |

Table 2 indicates the results from the polymerization of SAMPS with vinyl acetate in the examples, including relative molecular weight of the polymer indicated by the viscosity of a 15% solution in methanol, the actual percentage of solids in Reactor 2 and the percent conversions (figures in parentheses) calculated from the actual percent solids and theoretical percent solids (figures not in parentheses).

TABLE 2

Results From the Polymerization of SAMPS With Vinyl Acetate

| Example | 15% viscosity, cps | Reactor 2 solids | Theoretical solids (Conversion) |
|---|---|---|---|
| 1 | 7.3 | 72.4% | 74% (97.84%) |
| 2 | 8.9 | 79.80% | 83.65% (95.4%) |
| 3 | 13.5 | 70% | 75% (93%) |
| 4 | 7.3 | 6840% | 74.89 (91.33%) |
| 5 | 5.1 | 65.80% | 75.24% (87.45%) |
| 6 | 15.7 | 77.60% | 83.63% (92.79%) |
| 7 | 8.8 | 69.70% | 84.41% (82.57%) |
| 8 | 7.2 | 63% | 74.96% (84.04%) |
| 9 | 6.3 | 77.30% | 83.40% (92.59%) |
| 10 | 7 | 70.20% | 79.07% (88.78%) |
| 11 | 7.8 | 70.80% | 79.07% (89.55%) |

Table 2 shows the overall conversion of vinyl acetate and SAMPS into polymer. Based on these theoretical solids levels, which are directly related to the conversion of monomers to copolymer, the conversions range from 83% to 98%. No residual SAMPS were detected by $C^{13}$ NMR in any of the runs.

Saponification of the VAM/SAMPS copolymers was accomplished by treating the paste obtained from the Oldershaw column used to strip VAM from the effluent from Reactor 2 with 50 wt % aqueous NaOH at various values of caustic mole ratio (CMR) further diluted with methanol so that the solids content was 35 wt. %. Examples 12-17 illustrate the effect of varying conditions of saponification carried out on the VAM/SAMPS copolymer of Example 3, with the results shown in Table 3.

TABLE 3

Saponification of PVAc-AMPS

| Eample | CMR | Time of saponification | Temp of saponification | % hydrolysis | Target hydrolysis |
|---|---|---|---|---|---|
| 12 | 0.035 | 17 hours | RT C. | 96.45 | 99 |
| 13 | 0.045 | 17 hours | 40 C. | Ca. 97 | 99 |
| 14 | 0.03 | 17 hours | RT C. | 95.80 | 95 |
| 15 | 0.01 | 2 hours | RT C. | 84.62 | 88 |
| 16 | 0.01 | 2 hours | RT C. | 81.40 | 88 |
| 17 | 0.015 | 2.5 hours | RT C. | 92.60 | 88 |

RT = room temperature

Caustic mole ratio (CMR) was calculated with the assumption the polymer is 100% PVAc. The small amount of co-AMPS was ignored in the CMR calculation.

As stated, the 50% NaOH was diluted with enough MeOH when added to the paste to dilute the solids to 35%. The NaOH/MeOH was mixed into the paste by hand (10 to 20 min. of mixing) at room temperature. The 40° C. saponification gelled after about 1 minute of mixing. The paste was then allowed to react for the time and temperature shown in the above table. Saponification procedures similar to those described in Examples 12-17 were carried out on the polymers of Examples 1-11.

Table 4 shows the compositions and properties of the saponified polymers for each of the examples of Tables 1 and 2 including mol percents of polymerized SAMPS (SAMPS), polymerized VAM (PVAc) and polymerized vinyl alcohol (PVOH), degree of hydrolysis indicated by $C^{13}$ NMR, relative molecular weight as indicated by the viscosity of a 4% solution water and degree of hydrolysis indicated by titration.

TABLE 4

Composition of Copolymer and Final Viscosity
Composition of Saponified Polymer by C.sup.13 NMR
Final Results

| Example | SAMPS, mol % | PVAc, mol % | PVOH mol % | Degree of hydrolysis, % (C.sup.13 NMR) | 4% viscosity, cps | Degree of hydrolysis, (titration) |
|---|---|---|---|---|---|---|
| 1 | 1.31 | 4.44 | 94.25 | 95.5 | 3.92 | 95.65 |
| 2 | 2.87 | 2.48 | 94.65 | 97.45 | 4.37 | 96.68 |
| 3 | 3.39 | 2.46 | 94.15 | 97.46 | 5 | 98.91 |
| 4 | 3.42 | 1.52 | 95.06 | 98.43 | 3.94 | 96.24 |
| 5 | 3.12 | 2.42 | 94.46 | 97.5 | 2.59 | 98.41 |
| 6 | 1.48 | 2.09 | 95.53 | 96.96 | 6.11 | 97.43 |
| 7 | 2.83 | 2.23 | 94.94 | 97.7 | 3.71 | 98.37 |
| 8 | 1.6 | 1.26 | 7.14 | 998.72 | 3.58 | 98.91 |
| 9 | 1.54 | 1.31 | 97.15 | 98.67 | 2.97 | 98.72 |
| 10 | 2.03 | 1.79 | 96.18 | 98.17 | 3.53 | 98.47 |
| 11 | 2.07 | 2.45 | 95.48 | 97.49 | 3.78 | 97.85 |

$C^{13}$ NMR spectroscopy was used to determine the copolymer composition and the randomness of the SAMPS in the copolymer. The SAMPS feedrate was the only variable to control the SAMPS loading in the copolymer.

The data in Tables 1-4 indicates that copolymers of VOH and AMPS can be obtained at relatively high AMPS loadings, high conversion rates and productivity, high degree of hydrolysis and relatively low compositional drift, using the continuous process of this invention.

More generally, the invention includes a continuous process for making vinyl acetate/acrylamide or acrylamide derivative copolymers. Acrylamide or acrylamide derivative monomers and copolymers incorporating them are referred to herein as acrylamido comonomers and acrylamido copolymers, respectively, for purposes of convenience. There is thus provided in accordance with the invention a continuous process for making a vinyl acetate/acrylamido coppolymer comprising: (a) continuously supplying a reaction mixture including vinyl acetate and a more reactive acrylamido comonomer to a reaction zone wherein the vinyl acetate and acrylamido comonomer are at least partially consumed to form an intermediate reaction mixture; (b) continuously supplying to the intermediate reaction mixture a stream enriched with respect to the more reactive acrylamido comonomer and copolymerizing the additional acrylamido comonomer with the intermediate reaction mixture to form a vinyl acetate/acrylamido copolymer product; and (c) continuously recovering the vinyl acetate acrylamido copolymer product.

As stated above, copolymers of vinyl alcohol (VOH) with a minor amount of 2-acrylamido-2-methyl propane sulfonic acid in free acid form or as a salt of the free acid (AMPS) are useful for the production of cold water soluble films which can be formed into containers for predetermined batches of soaps and detergents. The following test results disclose the inherent novel properties of such a film made by the novel process of the present invention.

For example, in one embodiment, the inherent novel property of the product made by the novel process of the present invention can be determined by a "harsh chemical dissolution test method." The "harsh chemical dissolution test method" is defined as the time required for the film to dissolve completely (no film evident in slide frame or beaker) prepared by the following: a) "film preparation method;" b) "pouch containing harsh chemical preparation method;" and then c) the film is tested by the following "water solubility test method".

The inherent novel property of the product made by the novel process of the present invention, when made into a film, in one embodiment, has a harsh chemical dissolution time of less than about 80 seconds measured by the harsh chemical dissolution test method after 8 weeks, more specifically, less than about 50 seconds, more specifically, less than about 40 seconds, and more specifically, less than about 25 seconds.

In another example, in another embodiment, the inherent novel property of the product made by the novel process of the present invention can be determined by a "HCL dissolution test method." The "HCL dissolution test method" is defined as the time required for the film to dissolve completely (no film evident in slide frame or beaker) prepared by the following: a) "film preparation method;" and then b) the film is tested by the following "HCL solubility test method." The inherent novel property of the product made by the novel process of the present invention, when made into a film, in one embodiment, has an HCL dissolution time with a 3% HCL solution of less than about 120 seconds, more specifically, less than about 110 seconds, and more specifically, less than about 100 seconds. The inherent novel property of the product made by the novel process of the present invention, when made into a film, in one embodiment, has an HCL dissolution time with a 15% HCL solution of less than about 90 seconds, more specifically, less than about 85 seconds, and more specifically, less than about 80 seconds. The inherent novel property of the product made by the novel process of the present invention, when made into a film, in one embodiment, has an HCL dissolution time with a 28% HCL solution of less than about 75 seconds, more specifically, less than about 70 seconds, and more specifically, less than about 60 seconds.

Film Preparation Method

An aqueous solution of polymer (i.e. 4% polymer by weight) is made by dissolving the polymer in water. The aqueous solution is cast onto a glass plate and allowed to dry. The resulting film (2-3 mil thick) is peeled off the plate and placed into a control humidity at 50% Rh and temperature room at 70 F for 24 hours. The film is then cut into 2.5×3.5 cm pieces. It should be noted that no additional additives are used in making the film (e.g. such as propyl gallate).

Pouch Containing Harsh Chemical Preparation Method

A pouch is made in conditions having a temperature of 67.6F and 36.5% humidity. The film, made by the above "film preparation method," is cut in to 6"×3" pieces and folded in half to make a 3"×3" square. 3 sides of the square are heat-sealed using a hand held heat-sealing gun. 25 g of the tradename "Super Shock It" ("HTH" brand—54.6% calcium hypochlorite, 45.4% other ingredients, 53% available chlorine) are added to the pouch. The fourth side of the pouch is sealed.

Water Solubility Test Method

After 8 weeks, 3 filled and 2 control pouches from each material are tested. The filled pouches are cut open and the contents removed. A 2.3×3.4 cm film specimen from each side of the pouch are fixed in a slide frame as shown in the FIG. 1. A beaker is filled with 400 ml DI water and stirred at 400 rpm. The water temperature is maintained at 21° C.+/−1 C. The specimen is immersed in the water with the time required for the film to dissolve completely (no film evident in slide frame or beaker) is recorded. The average time, in seconds, for the 3 filled pouches is the time for the "harsh chemical dissolution test method after 8 weeks."

HCL Test Method

A 250 ml jacketed beaker, programmable stir plate, magnetic stir bar, stop watch, and 35 mm slide frame is used. Using concentrated HCl (Fisher HCl, certified A.C.S. Plus, lot# 002562, assay 37.5%) a 3%, 15% and 28% solution is prepared. A 2.3×3.4 cm film specimen is fixed in a slide frame as shown in the FIG. 1. A 225 ml of HCl solution (in a 0.25 liter beaker) is agitated via a magnetic stirrer (300 rpm) creating a vortex. The film made by the above "film preparation method" is immersed in the HCL solution with the time required for the film to dissolve completely (no film evident in slide frame or beaker) being recorded. The testing is performed at room temperature. The test procedure is repeated for each concentration of acid solution and film material. The average time, in seconds, for 3 film samples is the time for the "HCL dissolution test method" at a specific HCL concentration (i.e. 3%, 15% and 28% HCL solutions).

The following is an example of a product made by the process of the present invention that is tested by the "harsh chemical dissolution test method." The polymer was made by Example 1-1, detailed above. The films and pouches were made by the methods described above. Testing equipment included a 500 ml jacketed beaker, programmable digital stir plate, magnetic stir bar, digital thermometer, stop watch, and 35 mm slide frame. The beaker was filled with 400 ml DI water and stirred at 400 rpm. The water temperature was maintained at 21° C.+/−1° C. by a jacketed beaker. Each week, for 8 weeks, 3 filled and 2 control pouches from each material were tested. The filled pouches were cut open and the contents removed. A 2.3×3.4 cm film specimen from each side of the pouch was fixed in a slide frame as shown in the FIG. 1. The specimen was immersed in the water with the time required for the film to dissolve completely (no film evident in slide frame or beaker) is recorded as the time for the "harsh chemical dissolution test method" after the given week. The results are the following:

| | Weeks | | | | | | | | |
|---|---|---|---|---|---|---|---|---|---|
| | 0 | 1 | 2 | 3 | 4 | 5 | 6 | 7 | 8 |
| Dissolution Time (sec) | 35 | 32 | 32 | 31 | 26 | 29 | 36 | 37 | 31 |

The following is an example of a product made by the process of the present invention that is tested by the "HCL dissolution test method" The polymer was made by Example 1-1, detailed above. The films were made by the methods described above. A 250 ml jacketed beaker, programmable stir plate, magnetic stir bar, stop watch, and 35 mm slide frame was used. Using concentrated HCl (Fisher HCl, certified A.C.S. Plus, lot# 002562, assay 37.5%) a 3%, 15% and 28% solution was prepared. A 2.3×3.4 cm film specimen was fixed in a slide frame as shown in the FIG. 1. 225 ml of HCl solution (in a 0.25 liter beaker) was agitated via a magnetic stirrer (300 rpm) creating a vortex. The specimen was immersed in the water with the time required for the film to dissolve completely (no film evident in slide frame or beaker) being recorded. The testing was performed at room temperature. The test procedure was repeated for each concentration of acid solution and film material. The results were: a) for the 3% HCL solution, the "HCL dissolution test method" was 107 seconds; b) for the 15% HCL solution, the "HCL dissolution test method" was 81 seconds; and c) for the 28% HCL solution, the "HCL dissolution test method" was 60 seconds.

What is claimed is:

1. A product comprising a cold water soluble film wherein: a) the film comprises a copolymer of vinyl alcohol (VOH) with a minor amount of 2-acrylamido-2-methyl propane sulfonic acid in free acid form or as a salt of the free acid (AMPS); and b) the film has a harsh chemical dissolution time of less than about 80 seconds measured by the harsh chemical dissolution test method after 8 weeks.

2. The product of claim 1 wherein the film has a harsh chemical dissolution time of less than about 50 seconds measured by the harsh chemical dissolution test method after 8 weeks.

3. The product of claim 1 wherein the film has a harsh chemical dissolution time of less than about 40 seconds measured by the harsh chemical dissolution test method after 8 weeks.

4. The product of claim 1 wherein the film has a harsh chemical dissolution time of less than about 25 seconds measured by the harsh chemical dissolution test method after 8 weeks.

5. A product comprising a cold water soluble film that can be formed into containers for predetermined batches of soaps and detergents wherein: a) the film comprises a copolymer of vinyl alcohol (VOH) with a minor amount of 2-acrylamido-2-methyl propane sulfonic acid in free acid form or as a salt of the free acid (AMPS); and b) the film has a harsh chemical dissolution time of less than about 80 seconds measured by the harsh chemical dissolution test method after 8 weeks.

6. The product of claim 5 wherein the film has a harsh chemical dissolution time of less than about 50 seconds measured by the harsh chemical dissolution test method after 8 weeks.

7. The product of claim 5 wherein the film has a harsh chemical dissolution time of less than about 40 seconds measured by the harsh chemical dissolution test method after 8 weeks.

8. The product of claim 5 wherein the film has a harsh chemical dissolution time of less than about 25 seconds measured by the harsh chemical dissolution test method after 8 weeks.

9. The product of claim 5 wherein the degree of hydrolysis is at least above about 95%.

10. The product of claim 5 wherein the film has a HCL dissolution time of less than about 120 seconds measured by the HCL dissolution test method at 3% HCL solution.

11. The product of claim 5 wherein the film has a HCL dissolution time of less than about 110 seconds measured by the HCL dissolution test method at 3% HCL solution.

12. The product of claim 5 wherein the film has a HCL dissolution time of less than about 100 seconds measured by the HCL dissolution test method at 3% HCL solution.

13. The product of claim 5 wherein the film has a HCL dissolution time of less than about 90 seconds measured by the HCL dissolution test method at 15% HCL solution.

14. The product of claim 5 wherein the film has a HCL dissolution time of less than about 85 seconds measured by the HCL dissolution test method at 15% HCL solution.

15. The product of claim 5 wherein the film has a HCL dissolution time of less than about 80 seconds measured by the HCL dissolution test method at 15% HCL solution.

16. The product of claim 5 wherein the film has a HCL dissolution time of less than about 75 seconds measured by the HCL dissolution test method at 28% HCL solution.

17. The product of claim 5 wherein the film has a HCL dissolution time of less than about 65 seconds measured by the HCL dissolution test method at 28% HCL solution.

18. The product of claim 5 wherein the film has a HCL dissolution time of less than about 60 seconds measured by the HCL dissolution test method at 28% HCL solution.

19. The product of claim 5 wherein the viscosity is less than about 7 centipoise.

20. The product of claim 5 wherein the copolymer of vinyl alcohol (VOH) and 2-acrylamido-2-methyl propane sulfonic acid or a salt of such acid (AMPS) is produced by the method comprising continuously feeding with agitation, vinyl acetate (VAM) and AMPS as comonomers, a free radical yielding polymerization initiator, and a solvent for said comonomers, initiator, and copolymer resulting from the copolymerization of said comonomers into a first reaction zone, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, wherein the AMPS is fed continuously to the second reaction zone to minimize compositional drift of AMPS in the resulting copolymer, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a copolymer of VOH and AMPS.

21. A product comprising a cold water soluble film wherein: a) the film comprises a copolymer of vinyl alcohol (VOH) with a minor amount of 2-acrylamido-2-methyl propane sulfonic acid in free acid form or as a salt of the free acid (AMPS); and b) the film has a harsh chemical dissolution time of less than about 80 seconds measured by the harsh chemical dissolution test method after 8 weeks, wherein the copolymer of vinyl alcohol (VOH) and 2-acrylamido-2-methyl propane sulfonic acid or a salt of such acid (AMPS) is produced by the method comprising continuously feeding with agitation, vinyl acetate (VAM) and AMPS as comonomers, a free radical yielding polymerization initiator, and a solvent for said comonomers, initiator, and copolymer resulting from the copolymerization of said comonomers into a first reaction zone, maintaining the resulting reaction mass in said first reaction zone under polymerization conditions for a residence time sufficient for a major proportion of AMPS fed to said first reaction zone to polymerize, continuously feeding reaction mass from said first reaction zone with an additional supply of AMPS to a second reaction zone, wherein the AMPS is fed continuously to the second reaction zone to minimize compositional drift of AMPS in the resulting copolymer, maintaining the reaction mass in the second reaction zone for a residence time sufficient to polymerize a major proportion of the AMPS added to the second reaction zone, continuously withdrawing reaction mass from the second reaction zone, separating copolymer of VAM and AMPS from the latter reaction mass, and saponifying by hydrolysis and/or alcoholysis a major proportion of the acetate groups in said copolymer to form a saponified copolymer of VOH and AMPS, and wherein the saponified copolymer has low compositional drift with regard to variations in the content of AMPS in the saponified copolymer as determined by $^{13}C$ NMR, as compared to the compositional drift with regard to variations in the content of AMPS in a comparative saponified copolymer of VOH and AMPS produced via a batch process.

22. The product of claim 21 wherein the film has a harsh chemical dissolution time of less than about 50 seconds measured by the harsh chemical dissolution test method after 8 weeks.

23. The product of claim 21 wherein the film has a harsh chemical dissolution time of less than about 40 seconds measured by the harsh chemical dissolution test method after 8 weeks.

24. The product of claim 21, wherein the film is formed into a container for a predetermined batch of soaps and detergents.

25. The product of claim 21, wherein the film has a HCL dissolution time of less than about 120 seconds measured by the HCL dissolution test method at 3% HCL solution.

* * * * *